(12) United States Patent
Levin

(10) Patent No.: US 9,365,141 B2
(45) Date of Patent: Jun. 14, 2016

(54) VEHICLE WITH A DRIVER SEAT UNIT COMPRISING A VERTICALLY SUSPENDED FLOOR STRUCTURE

(75) Inventor: Göran Levin, Hisings-Kärra (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/399,540

(22) PCT Filed: May 8, 2012

(86) PCT No.: PCT/SE2012/000067
§ 371 (c)(1),
(2), (4) Date: Mar. 31, 2015

(87) PCT Pub. No.: WO2014/003609
PCT Pub. Date: Jan. 3, 2014

(65) Prior Publication Data
US 2015/0217664 A1    Aug. 6, 2015

(51) Int. Cl.
| | | |
|---|---|---|
| *B62D 33/06* | (2006.01) | |
| *B62D 33/063* | (2006.01) | |
| *B60N 2/50* | (2006.01) | |
| *B62D 25/20* | (2006.01) | |
| *B60N 2/54* | (2006.01) | |
| *B60N 2/16* | (2006.01) | |

(Continued)

(52) U.S. Cl.
CPC ........ *B60N 2/502* (2013.01); *B60N 2/16* (2013.01); *B60N 2/1665* (2013.01); *B60N 2/24* (2013.01); *B60N 2/525* (2013.01); *B60N 2/527* (2013.01); *B60N 2/544* (2013.01); *B62D 25/20* (2013.01); *B62D 33/0604* (2013.01)

(58) Field of Classification Search
CPC ........... B62D 25/20; B60N 2/16; B60N 2/24; B60N 2/544
USPC .................................. 180/89.13, 89.18
See application file for complete search history.

(56) References Cited

U.S. PATENT DOCUMENTS 3,774,711 A   11/1973  Lacey
6,540,283 B1 *  4/2003  Johansson ............ B62D 33/067
                                                180/89.14

(Continued)

FOREIGN PATENT DOCUMENTS

DE            110815 A1    1/1975
DE       102007022654 A1   2/2008

(Continued)

OTHER PUBLICATIONS

Translation of JP 398188 Oct. 11, 1991; Cited on IDS filed Jan. 7, 2016.*

(Continued)

*Primary Examiner* — Faye M Fleming
(74) *Attorney, Agent, or Firm* — WRB-IP LLP

(57) ABSTRACT

A vehicle with a driver's cab including a driver seat unit with a vertically suspended floor structure and including a steering control, a speed control, and a driver's seat. The cab is provided with a locking mechanism for preventing the floor structure from moving vertically in relation to the cab when the vehicle is immobile. The floor structure is able to move from a first position to a second position, lower than the first position, when the driver's door is opened and to move back to the first position when the driver's door is closed.

10 Claims, 1 Drawing Sheet

(51) Int. Cl.
  *B60N 2/24* (2006.01)
  *B60N 2/52* (2006.01)

(56) References Cited

U.S. PATENT DOCUMENTS 7,887,033 B2 * 2/2011 Shoemaker ............ B60N 2/501
  267/136
8,991,538 B2 * 3/2015 Angelo ................ B62D 33/063
  180/89.12

FOREIGN PATENT DOCUMENTS

| DE | 102010054410 A1 | 7/2011 |
|---|---|---|
| GB | 1440686 A | 6/1976 |
| JP | 5743712 | 3/1982 |
| JP | 398188 | 10/1991 |
| JP | 06286649 | 10/1994 |
| JP | 2000303499 | 10/2000 |
| JP | 20t 326051 | 1/2003 |
| JP | 2005075232 | 3/2005 |
| JP | 2006077544 | 3/2006 |

OTHER PUBLICATIONS

International Search Report (Dec. 2, 2013) for corresponding International Application PCT/SE2012/000067.
International Preliminary Report on Patentability (Mar. 27, 2014) for corresponding International Application PCT/SE2012/000067.
Japanese Official Action (translation) (Dec. 11, 2015) from corresponding Japanese Application 2015-011399.

* cited by examiner

VEHICLE WITH A DRIVER SEAT UNIT COMPRISING A VERTICALLY SUSPENDED FLOOR STRUCTURE

BACKGROUND AND SUMMARY

The present invention relates to a vehicle with a driver's cab comprising a driver seat unit with a vertically suspended floor structure including means for steering control, means for speed control and a driver's seat.

The driver seating arrangement for heavy trucks and heavy construction vehicles usually comprises a seat with suspension for driver comfort. One disadvantage with seat suspension is that the seat moves up and down when driving over road surface deviations, in relation to the steering wheel, the pedals and other vehicle controls. Thus, the vertical movements can make it more difficult to control a heavy vehicle in a tight situation.

Also, the vertical movements of the driver may reduce the quality of sensor data used as input to systems for driver awareness detection. For example, these systems often use input data from different vehicle control sensors to monitor driver awareness.

For example U.S. Pat. No. 3,774,711 discloses a drivers cab with a seat mounted on a platform that includes a steering wheel and foot pedals. The platform is mounted to the cab floor via a vertical suspension system.

A heavy truck used for long distance hauling needs a driver's cab which is flexible to provide an ergonomic workplace when driving on the road, and also to provide a functional living space when resting in between driving times. As the total length of the vehicle is limited in many countries, cab length is limited to maximize cargo capacity. When a suspended driver platform as described above is applied to this type of vehicle, the suspended platform will normally consume a large part of the available floor space. The suspended platform does not provide a stable surface for moving around inside the cab when parked, and could be a potential safety risk for the driver. Also, when the driver leaves the suspended platform for exiting the cab, the driver has to climb down a number of vertical steps from a considerable height, often about 1.5 meters above ground. Initially, the driver must transfer his weight from the suspended platform to the cab frame or to the uppermost step. As a consequence of the weight transfer, the platform moves upwards until it reaches a top position. This problem may also exist at construction vehicles.

Usually, the driver's seat is located close to a side door of the cab. Thus, the driver has very little room for safe movement near to a considerable vertical drop.

It is desirable to provide a vehicle with a suspended driver's platform in which the above described problems are minimized.

According to an aspect of the invention, the driver's cab is provided with a locking mechanism for preventing the floor structure from moving vertically in relation to the cab when the vehicle is immobile.

The locking mechanism is preferably operated by means of a parking brake system to prevent the suspended floor structure from moving vertically when the parking brake system is activated.

Preferably, the floor structure is arranged in a cab with a primary floor and a secondary floor positioned a certain distance below the primary floor.

Advantageously, the floor structure is adapted to be restrained in a first mode of position level with the primary floor of the vehicle.

According to an advantageous embodiment of the invention, the floor structure is able to release and reposition itself from said first mode of position to a second mode of position below said first mode of position, to form a step for climbing into and out of the driver's cab.

Preferably, the repositioning of the floor structure between said two modes of position is actuated by means of the opening and closing of the driver's door, so that the floor structure is lowered to the second mode of position when the driver's door is opened and raised to the first mode of position when the driver's door is closed. Advantageously, actuation of repositioning of the floor structure via opening and closing of the driver's door can be switched on and off.

According to a preferable embodiment of the invention, the floor structure is suspended by means of a pneumatically controlled spring system.

According to still another embodiment of the invention, the pneumatically controlled spring system is adapted to control seat ride height relative to driver weight. Also, the pneumatically controlled spring system can be adapted to control seat ride height in relation to driver length.

Preferably, vertical motion of the floor structure is controlled by means of a hydraulic piston.

Further embodiments of the invention are illustrated and explained in the figures.

DETAILED DESCRIPTION

Figure 1:
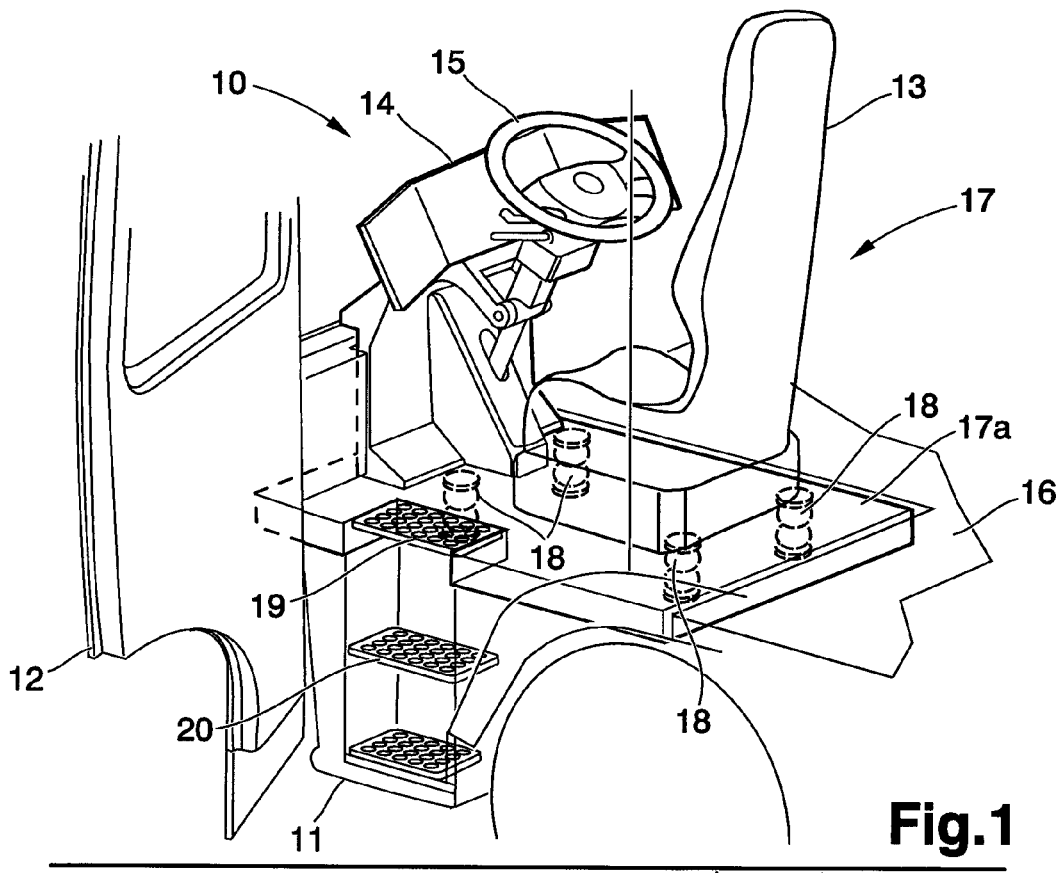
FIG. 1 shows the driver's cab of a commercial vehicle according to the invention in a schematic broken perspective view, with a driver seat unit in a first mode of position.
Figure 2:
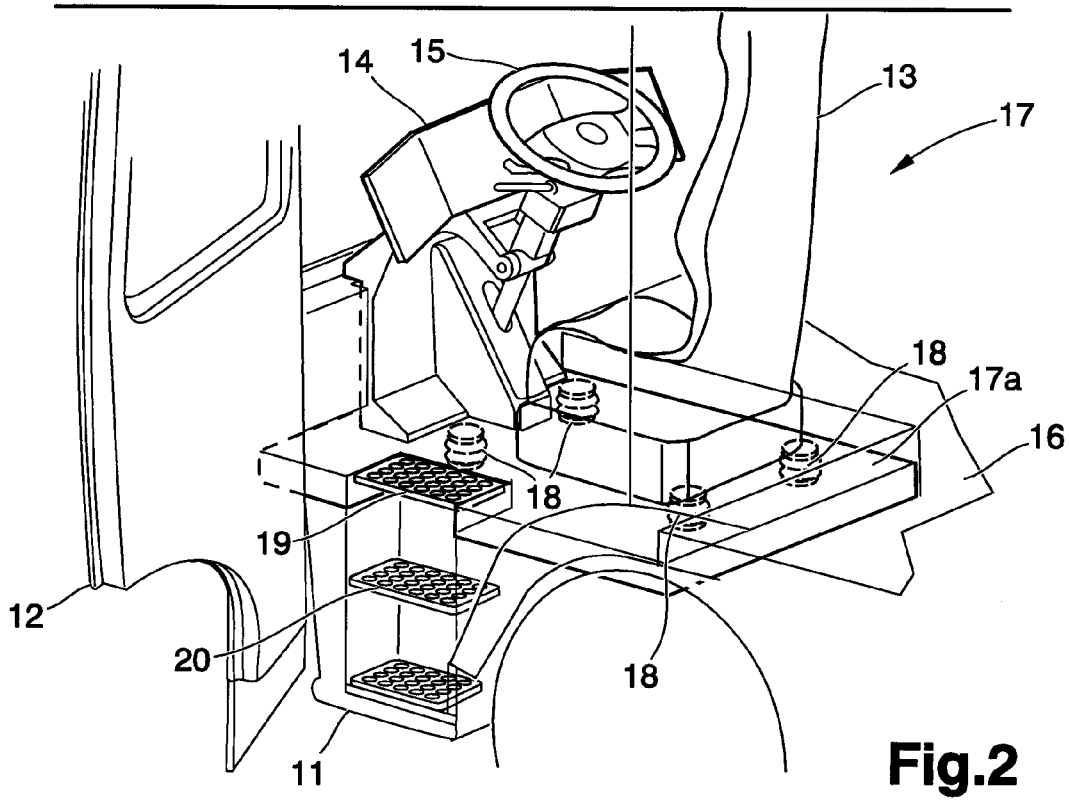
FIG. 2 shows the truck according to FIG. 1 with the driver seat unit in a second mode of position.

FIGS. 1 and 2 show in a broken view a commercial truck comprising a driver's cab 10 and a chassis 11. The driver's cab is provided with a side door 12, a driver's seat 13 and an instrument cluster 4 with a steering wheel 5. The cab 10 is suspended in a conventional manner in relation to the chassis 11 via not shown suspension means.

The lower part of the cab is provided with a double floor comprising a primary floor 16 and a secondary floor, together forming a cavity below the interior of the cab. This cavity can be used for housing equipment including electrical components, for example a vehicle control unit, and also a unit for controlling the cab interior temperature and ventilation, for example an air conditioning unit.

The provision of a double floor cavity makes it possible to equip the cab with a vertically suspended driver unit 17 comprising a floor structure 17a including the driver's seat 13, the instrument cluster with steering wheel 15 and speed controls for the vehicle. The speed controls may comprise pedals for speed and braking and also a gear selector not shown in the drawings). The floor structure 16 is mounted upon the secondary floor via four shock absorber units 18.

The cab is provided with a locking mechanism for preventing the floor structure from moving vertically in relation to the cab when the vehicle is immobile. Mechanical springs may be used to preload the shock absorber units. A locking mechanism comprising lock bolts may be used for arresting the floor structure in a fixed position, so that the to of the floor structure is level with the top of the primary floor.

Alternatively, the shock absorber units ma use hydraulic dampers to dampen vertical movements of the floor structure. Valves in the hydraulic circuits of the dampers can then be used for locking the floor structure in any position within the range of vertical movement. Preferably, air pressure is used for providing adjustable preload of the shock absorber units. The adjustable preload may be utilized for automatic control of seat ride height, for example in relation to driver weight or in relation to driver length by increasing or decreasing the air pressure preload. Control of seat ride height may be manual, alternatively via programmable memory settings or via a fully automatic sensor controlled system.

The locking mechanism for the floor structure 17a is preferably operated/controlled by means of a vehicle parking brake system to prevent the floor structure from moving vertically when the parking brake system is activated. When the locking system for the driver unit floor structure is activated, the cab floor including the driver unit floor structure provides a continuous flat surface, which is safe for moving around inside the cab when it is parked. Also, exiting the cab 10 via the door 12 is made safer by having a stable surface to step down from the area of the upper step 19 to the middle step 20.

According to an advantageous embodiment of the invention, the upper step 19 is connected to the suspended floor structure 7a, so that it is level with the top of the primary floor 16. When the vehicle is parked, the driver unit is normally locked in a first mode of position so the top of the floor structure is level with the primary floor 16 of the vehicle. When the driver is going to exit the cab 10, the driver can lower the driver unit to a second mode of position, in which the upper step 19 comes closer to the next middle step 20 for entering or exiting the cab. The positioning of the driver unit can be controlled by different means, for example by means of remote control via a button on the vehicle door lock key. Alternatively, the positioning of the driver unit can be automatically controlled by a door lock sensor, so that the driver unit is moved from its first mode of position to its second mode of position when the cab door 12 is opened and vice versa. In this manner, entering or exiting the cab of a commercial truck is made easier and safer. Preferably, the automatic repositioning of the driver unit 17 can be switched off if desired.

The invention has mainly been described above with reference to the disclosed embodiments. However, as is readily appreciated by the person skilled in the art, embodiments other than the ones disclosed above are equally possible within the scope of the invention, as defined by the appended claims.

The invention claimed is:

1. A vehicle with a chassis and a driver's cab attached to the chassis, the cab comprising a driver seat unit with a vertically suspended floor structure, the floor structure being adapted to move vertically in relation to the cab, the cab including means for steering control, means for speed control and a driver's seat, wherein the cab is provided with a locking mechanism for preventing the floor structure from moving vertically in relation to the cab when the vehicle is immobile, wherein the locking mechanism is operated by means of a parking brake system to prevent the suspended floor structure from moving vertically when the parking brake system is activated.

2. The vehicle as claimed in claim 1, wherein the floor structure is arranged in a cab with a primary floor and a secondary floor positioned a certain distance below the primary floor.

3. The vehicle as claimed in claim 2, wherein the floor structure is adapted to be restrained in a first mode of position level with the primary floor of the vehicle.

4. The vehicle according to claim 3, wherein the floor structure is able to release and reposition itself from first mode of position to a second mode of position below first mode of position, to form a step for climbing into and out of the driver's cab.

5. The vehicle according to claim 4, wherein the repositioning of the floor structure between two modes of position is actuated by means of the opening and closing of the driver's door, so that the floor structure is lowered to the second mode of position when the driver's door is opened and raised to the first mode of position when the driver's door is closed.

6. The vehicle according to claim 5, wherein actuation of repositioning of the floor structure via opening and closing of the driver's door can be switched on or off.

7. The vehicle according to claim 1, wherein the floor structure is suspended by means of a pneumatically controlled spring system.

8. The vehicle according to claim 7, wherein the pneumatically controlled spring system is adapted to control seat ride height relative to driver weight.

9. The vehicle according to claim 8, wherein the pneumatically controlled spring system is also adapted to control seat ride height in relation to driver length.

10. The vehicle according to claim 1, wherein vertical motion of the floor structure is controlled by means of a hydraulic piston.

* * * * *